United States Patent
Ng et al.

(10) Patent No.: US 11,385,665 B2
(45) Date of Patent: Jul. 12, 2022

(54) TEMPERATURE COMPENSATION FOR AN ELECTRONIC THERMOSTAT

(71) Applicant: Computime Ltd., New Territories (HK)

(72) Inventors: Yau Wai Ng, Hong Kong (CN); Hung Bun Choi, Hong Kong (CN); Chun Kit Chu, Hong Kong (CN)

(73) Assignee: Computime Ltd., New Territories (HK)

(*) Notice: Subject to any disclaimer, the term of this patent is extended or adjusted under 35 U.S.C. 154(b) by 94 days.

(21) Appl. No.: 16/867,782

(22) Filed: May 6, 2020

(65) Prior Publication Data

US 2021/0349485 A1    Nov. 11, 2021

(51) Int. Cl.
| | | |
|---|---|---|
| G05D 23/19 | (2006.01) | |
| G05D 23/32 | (2006.01) | |
| F24F 11/30 | (2018.01) | |
| F24F 110/10 | (2018.01) | |

(52) U.S. Cl.
CPC .............. G05D 23/32 (2013.01); F24F 11/30 (2018.01); G05D 23/193 (2013.01); G05D 23/1931 (2013.01); F24F 2110/10 (2018.01)

(58) Field of Classification Search
CPC ........... G05D 23/1902; G05D 23/1928; G05D 23/1931; G05D 23/32; G05D 23/193; G05D 23/30
See application file for complete search history.

(56) References Cited

U.S. PATENT DOCUMENTS

| | | | |
|---|---|---|---|
| 7,024,283 B2* | 4/2006 | Bicknell | G05D 23/1931 165/200 |
| 9,950,590 B2* | 4/2018 | Bryant | B60H 1/32 |
| 10,712,036 B2* | 7/2020 | Mowris | F24F 11/61 |
| 2008/0217418 A1 | 9/2008 | Helt et al. | |
| 2009/0062965 A1* | 3/2009 | Alhilo | G05B 13/021 700/278 |
| 2010/0128754 A1 | 5/2010 | Jetter et al. | |
| 2018/0094826 A1 | 4/2018 | Smith et al. | |
| 2019/0178511 A1* | 6/2019 | Zimmerman | G05D 23/1931 |

FOREIGN PATENT DOCUMENTS

| | | | | |
|---|---|---|---|---|
| JP | 3829637 B2 * | 7/2006 | | G01K 7/12 |
| JP | 3829637 B2 | 10/2006 | | |
| KR | 10-2018-0093304 A | 8/2018 | | |

OTHER PUBLICATIONS

Aug. 20, 2021—(WO) International Search Report and Written Opinion—App PCT/US2021/030583.

* cited by examiner

*Primary Examiner* — Jerry-Daryl Fletcher
*Assistant Examiner* — Daniel C Comings
(74) *Attorney, Agent, or Firm* — Banner & Witcoff, Ltd.

(57) ABSTRACT

An aspect of the embodiments provides a compensation for the temperature rise effect on the printed circuit board (PCB) of an electronic thermostat to obtain better precision and performance. Once the measurements from the temperature sensors have stabilized, the compensated ambient temperature may be used by an associated system (for example, a Heating, Ventilation, and Air Conditioning (HVAC) system).

21 Claims, 11 Drawing Sheets

TEMPERATURE COMPENSATION FOR AN ELECTRONIC THERMOSTAT

TECHNICAL FIELD

Aspects of the disclosure relate to thermally compensating a measured ambient temperature by an electronic thermostat for internally generated heat dissipation.

BACKGROUND OF THE INVENTION

A Heating Ventilation and Air Conditioning (HVAC) system typically comprises one or more thermostats, a heating unit, a cooling unit, and a distribution system. The heating unit heats a medium (for example, air or water); a cooling unit cools the medium; the distribution system distributes the medium throughout an affected entity (for example, a house or building); a control unit controls the heating unit, the cooling unit, and the flow of the medium through the distribution system; and one or more thermostats providing the control unit one or more temperature values throughout the affected entity.

The thermostat may be considered as the important component of the HVAC system because that's what triggers the entire system to start cooling or heating. The performance of the HVAC system is consequently highly dependent on the accuracy of the thermostat.

SUMMARY OF THE INVENTION

An electronic thermostat typically has an ambient temperature sensor for measuring the ambient temperature of the proximate region around the electronic thermostat. However, the electronic may have electrical components (for example, a microprocessor unit (MPU), power supply unit, display, display backlight, relays, and so forth) that generate internal heat, thus degrading the accuracy of the ambient temperature sensor.

The ambient temperature sensor is typically mounted on the thermostat's printed circuit (PCB), and thus the ambient temperature sensor is often affected by the heat dissipation generated by the thermostat's components. As a result, the sensed temperature due to the component's heat dissipation needs to be compensated in order to obtain the accurate room temperature.

With another aspect, a compensation process is based on one or more temperature compensation sensors. A narrow thermal pathway is established between the ambient temperature sensor and the one or more temperature compensation sensors. Based on the compensation temperature measured by the one or more temperature compensation sensors, the measured ambient temperature is compensated for the internally generated heat.

With another aspect, an electronic thermostat comprises a main compartment and a sensor chamber that thermally isolates the two temperature sensors. The first sensor measures an ambient temperature and the second temperature sensor measures a compensation temperature. The measured ambient temperature is compensated by a compensation amount based on the compensation temperature and a thermal parameter that characterizes the thermal properties of the electronic thermostat.

With another aspect, a thermal pathway is formed between a temperature compensation sensor and in an ambient temperature sensor that are located in a sensor chamber. The thermal pathway thermally connects to a main compartment of the electronic thermostat to the sensor chamber and restricts heat flow to the temperature compensation sensor and the ambient temperature sensor from the main compartment.

With another aspect, a perimeter of a sensor chamber is formed by an internal partition separating a main compartment of an electronic thermostat from the sensor chamber and by one or more sides of the thermostat's housing.

With another aspect, the sensor chamber is properly shielded from the main compartment and allows the heat flowing from the main compartment to the ambient temperature sensor through the narrow pathway(s) and the temperature compensation sensor only. There are at least two ventilation openings through a side (wall) of the sensor chamber that is provided by the thermostat housing. The ventilation holes allow air flow from the ambient environment into the sensor chamber for ambient temperature measurement.

With another aspect, the electronic thermostat includes a processing device that compensates a measured ambient temperature for internally generated heat. In order to do so, the processing device obtains a thermal parameter (for example, a thermal resistance ratio) that characterizes thermal characteristics of the electronic thermostat. The processing device receives the measured ambient temperature ($T_s$) and the measured compensation temperature ($T_{c1}$) from the ambient temperature sensor and the compensation temperature sensor, respectively. The processing device then determines a compensated ambient temperature ($T_{ambient}$) from the measured ambient temperature, the measured compensation temperature, and the thermal parameter. The processing device may determine the amount of compensation by multiplying the thermal resistance ratio by a temperature difference between the measured compensation temperature and the measured ambient temperature.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

Accurate temperature measurement is often essential for an electronic thermostat. For example, if the temperature measurement obtained from the electronic thermostat is not sufficiently accurate, then operation of an associated environmental system (for example, a heating, ventilation, and air conditioning (HVAC) system) may be degraded. However, the electronic components on a printed circuit board (PCB) of the thermostat may internally generate heat on the PCB. The amount of dissipated heat typically varies with the processing capability of the incorporated processor, typically increasing from a low-end microcontroller unit (MCU) to a high-end process unit.

Moreover, the market is moving toward increased functionality of an electronic thermostat in a home Internet of Things (IoT) system. This trend generally requires more powerful processing devices with more elaborate peripheral devices (for example, a LCD display with a backlight) to support more complicated IoT control functions. Such devices often consume more electrical power resulting in increased heat dissipation with the electronic thermostat.

A temperature sensor unit is usually mounted on the thermostat's PCB, and therefore the temperature sensor is easily affected by the heat dissipation from the thermostat's components. As a result, the sensed temperature due to the component's heat dissipation needs to be compensated in order to obtain a more accurate room temperature. Embodiments may support an approach for temperature compensation that is advantageous with respect to traditional electronic thermostats, resulting in improved temperature measurement accuracy.

With some embodiments, a compensation process is based on at least two or more temperature sensing units. One sensor is associated with ambient temperature sensing and another sensor is associated with measuring the temperature of PCB board at a location (point) where dissipated heat flows from that point to the sensor component via a narrow thermal passageway. The ambient temperature sensor may be located on a stand-alone PCB board with a special PCB layout structure, where the stand-alone PCB board connects to the main PCB by a narrow passageway or a narrow connecting bridge.

Embodiments may include an isolated sensor chamber containing an ambient temperature sensor. The sensor chamber isolates air flow by convention between the main PCB board and the ambient sensor.

Figure 1:
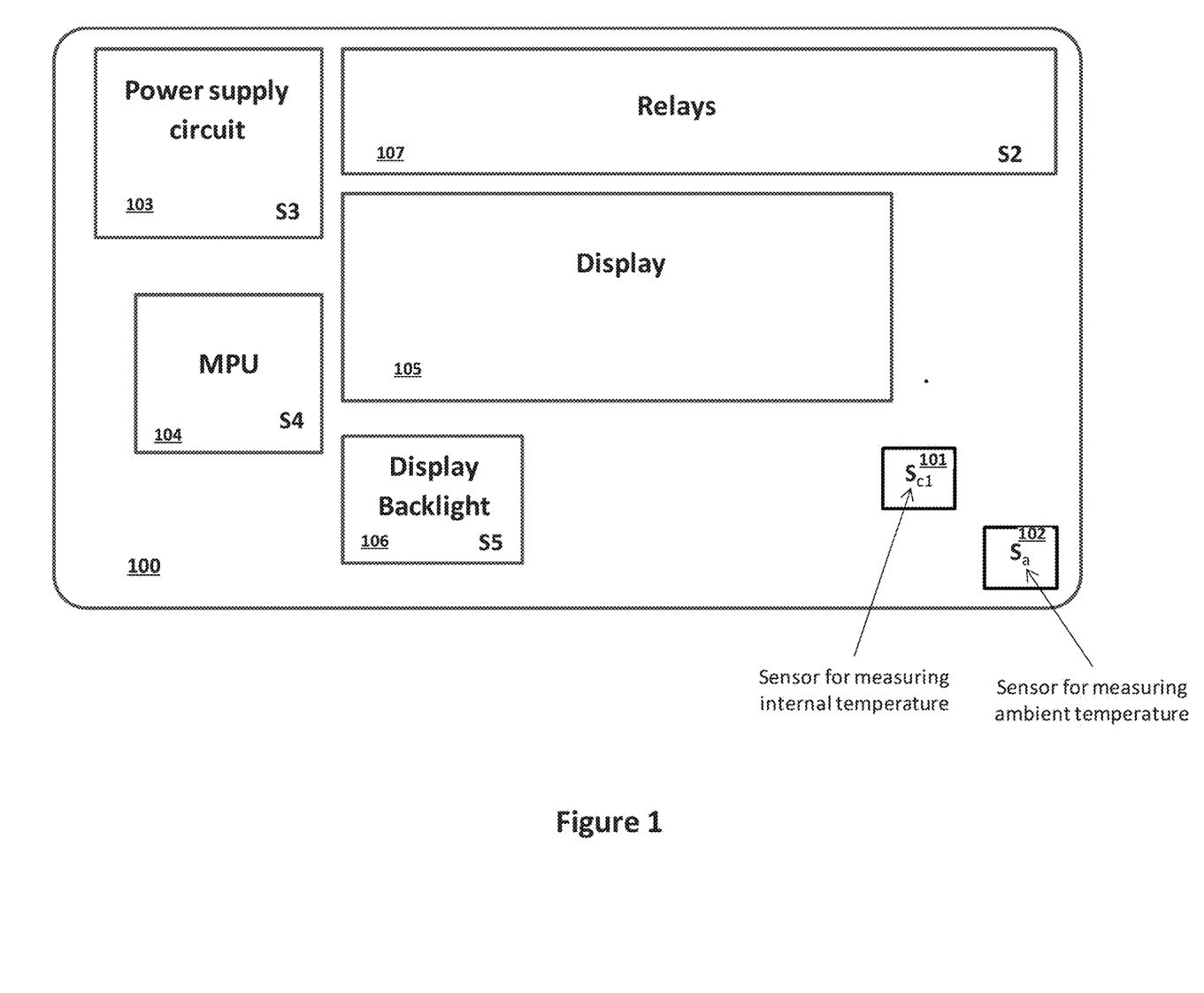
FIG. 1 shows a component placement topology of an exemplary electronic thermostat in accordance with an embodiment.

FIG. 1 shows a component placement topology of exemplary electronic thermostat 100 in accordance with an embodiment. Electronic components include microprocessor unit (MPU) 104, power supply unit 103, display 105, display backlight 106, relays 107, temperature compensation sensor $S_{c1}$ 101, and ambient temperature sensor $S_a$ 102.

Each component is typically an internal heat source that may impact the temperature measurement accuracy of ambient temperature sensor $S_a$ 102. Components include, but are not limited to:

Power supply circuit 103 may provide 6 Vdc, 12 Vdc, 24 Vdc, 24 Vac, 110 Vac, or 230 Vac.

MPU 104 may include 8051, MIPS, ARM9, ARM11, ARM Cortex M3, M4, ARM Cortex A9, or A7 integrated circuits.

Display backlight circuit 106 may comprise light emitting diodes (LED's), twisted nematic (TN) displays, and/or thin-film transistor (TFT) displays.

Relays 107 may include normal relays, latch relays, and/or solid state relays.

Other electronic components including memory (not explicitly shown), display 105, input keys, indication LED's, connectivity modules, sensors, and so forth.

Figure 2:
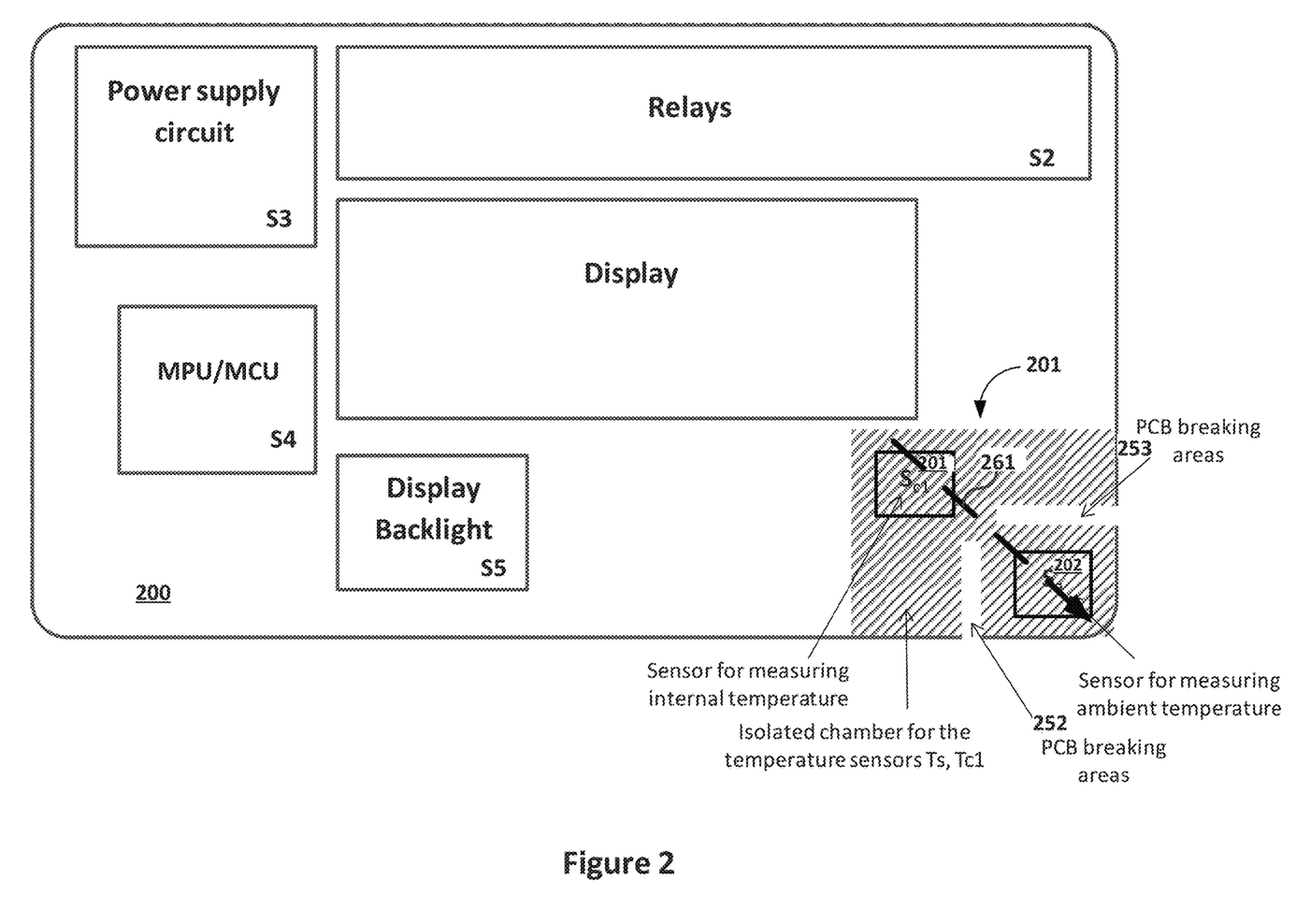
FIG. 2 shows a sensor chamber to restrict convection of air flow in an electronic thermostat in accordance with an embodiment.

FIG. 2 shows sensor chamber 201 that controls air flow convection in electronic thermostat 200 in accordance with an embodiment.

In order to control the heat transferred by convection of air flow inside the thermostat, sensor chamber 201 (denoted by the shaded area in FIG. 2) restricts the air flow between the circuit components, which may be located in a main compartment of electronic thermostat 200, and sensor chamber 201 (sensor compartment), where ambient temperature sensor 202 is located.

The internal sides of sensor chamber 201 may be formed by partitions (walls) that span between the PCB and a parallel side of the housing of electronics thermostat 200 while one or more other sides of the thermostat housing (not explicitly shown) serve as external sides of sensor chamber 201. The internal sides provide a thermal shield between the main compartment of thermostat 200 and sensor chamber 201.

There are two thermal mechanisms for transferring heat from the main compartment to temperature sensors 201 and 202: a) air flow within thermostat 200 and b) the PCB trace. With some embodiments, the impact of air flow is minimized by the sensor chamber 201 that includes a thermal shield between the main compartment and sensor chamber 201. The impact of heat transfer via the PCB trace may be ameliorated by notches in the PCB (for example, notches 252 and 253). Vent holes in the housing (more readily shown as vent holes 452a-e in FIG. 4) ensure that air from the ambient environment flows through sensor chamber 201 for measuring the ambient temperature.

One objective of the embodiments is to reduce transferred heat into the sensor chamber 201. The heat is primarily generated by the components in the main compartment and transferred to sensor chamber 201 via thermal connectivity that includes air convection and heat conduction via the PCB board and traces. In order to do so, one or more narrow thermal pathways are established between temperature compensation sensor 201 and ambient temperature sensor 202.

Sensor chamber 201 is thermally shielded from the main compartment by partitions to minimize the impact of internal air flow to ambient measurement sensor 202. In addition, compensation of the internal heat upon ambient temperature sensor 202 may be determined with temperature compensation sensor 201 by establishing narrow thermal pathways such as thermal pathway 261.

In addition, thermal transfer is limited by notches (gaps) 252 and 253 (PCB breaking areas) formed on the PCB. Consequently, a controlled thermal conduction through thermal pathway 261 is established from compensation temperature sensor 201 to ambient temperature sensor 202. As shown in FIG. 2, thermal pathway 261 is established from temperature compensation sensor 201 to ambient temperature sensor 202. With this approach, the impact of generated heat by the heat sources and PCB traces from the main compartment is controlled and reduced as well as compensated as will be discussed.

Thermal pathways limit the thermal power that can flow from main PCB board to ambient temperature sensor 202. In addition, the direction that thermal power flows through narrow pathway 261 can be estimated from the temperature difference between the two ends of pathway 261 via one or more temperature compensation sensors, for example, temperature compensation sensor 201 as shown in FIG. 2.

By estimating the thermal power flowing through the thermal pathways, the temperature rise due to the thermal power conducted from the main PCB board may be calculated. As a result, the error due to the thermal heat from major heating components may be compensated at ambient temperature sensor 202.

With one approach of the embodiments, a method for calculating the temperature change due to thermal power flowing through points A and B may be estimated by:

$$\Delta T_{AB} = T_A - T_B = P_D * R_{QAB}, \text{ where}$$

$T_A$ is the temperature at reference point "A".
$T_B$ is the temperature at reference point "B".
$\Delta T_{AB}$ is the temperature difference between reference points "A" and "B".
$P_D$ is the power dissipation source of heat flux (Watts).
$R_{\theta AB}$ or $R_{THAB}$ is the thermal resistance between reference points "A" and "B".

Figure 3A:
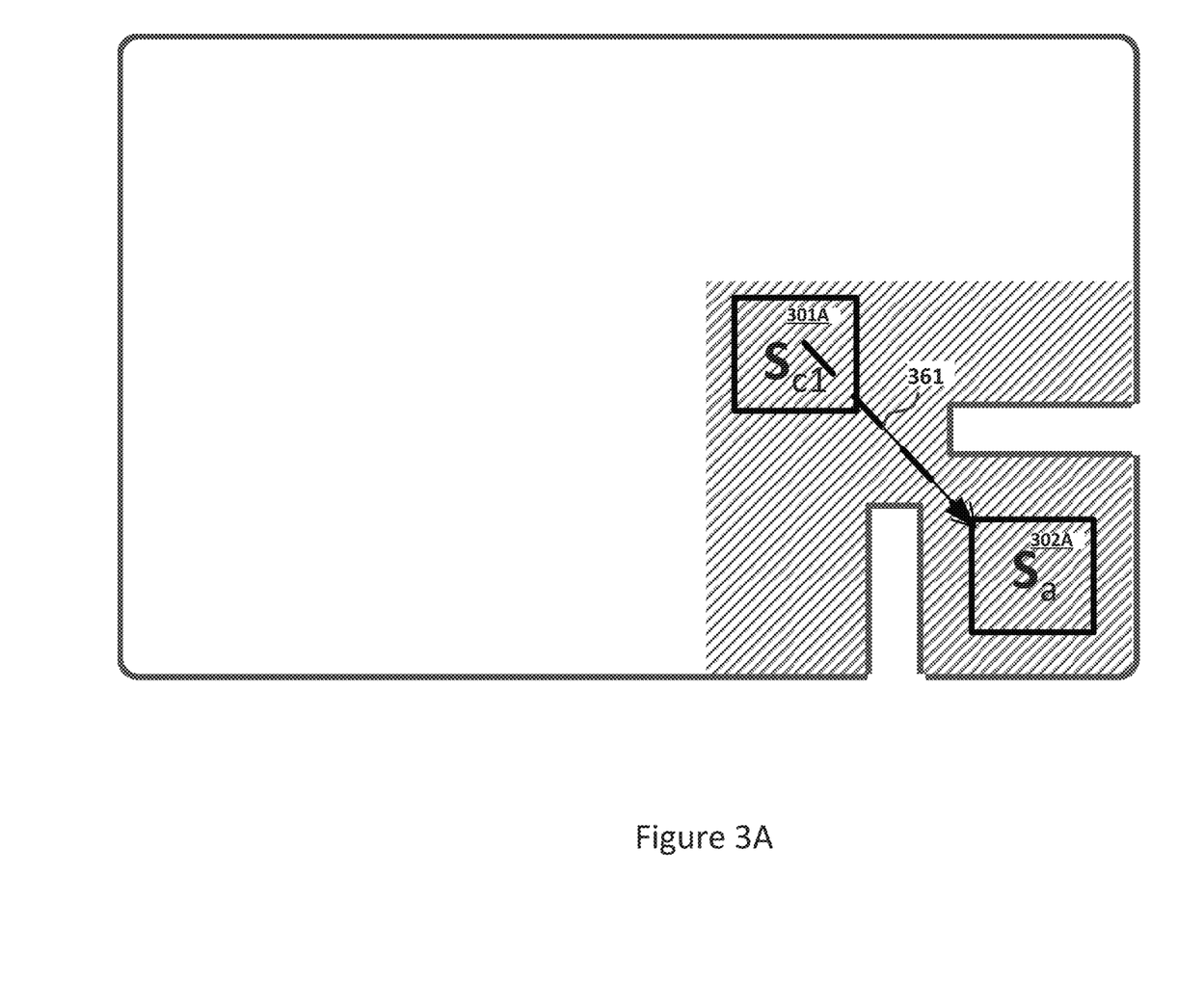
FIGS. 3A-C shows different ways for isolating an ambient temperature sensor from other printed circuit board (PCB) components of an electronic thermostat in accordance with an embodiment.
Figure 3B:
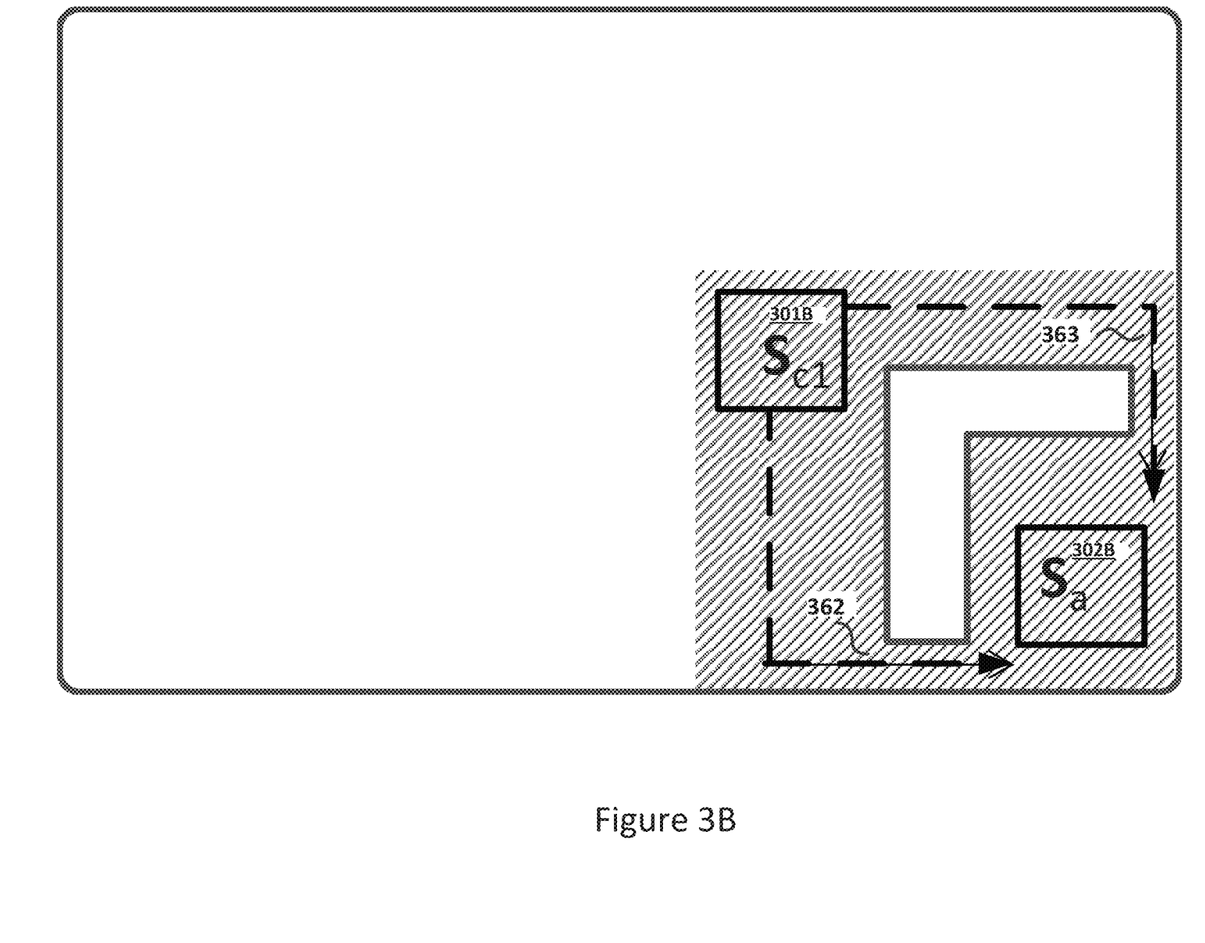
Figure 3C:
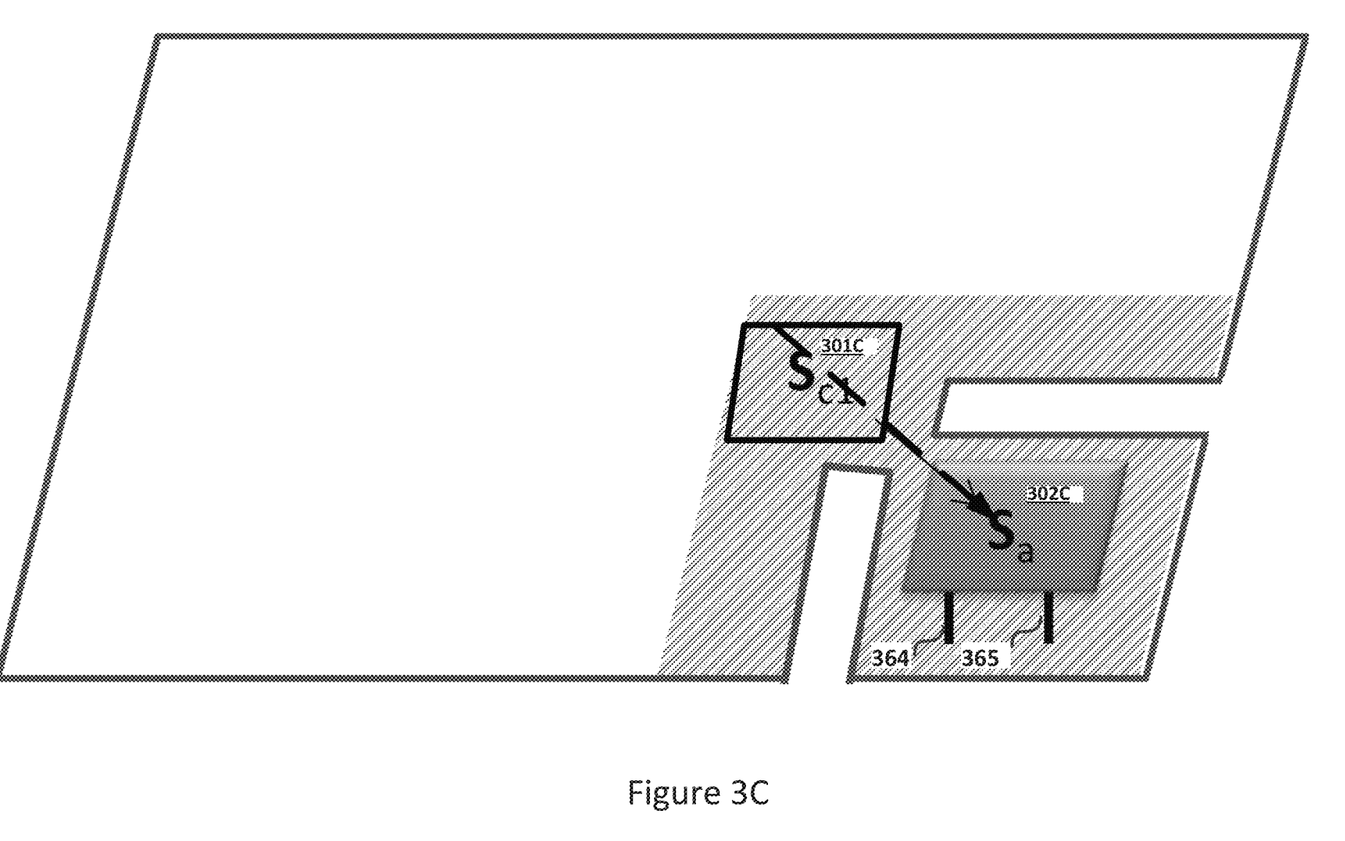

FIGS. 3A-C shows different ways for isolating an ambient temperature sensor from other PCB components of an electronic thermostat in accordance with an embodiment.

FIG. 3A shows a first structure, where there is one thermal pathway 361 similar to the structure shown in FIG. 2. Thermal pathway 361 traverses from temperature compensation sensor ($S_{c1}$) 301A to ambient temperature sensor ($S_a$) 302A.

FIG. 3B shows a second structure, where there are two pathways 362 and 363 traversing from temperature compensation sensor ($S_{c1}$) 301B to ambient temperature sensor ($S_a$) 302B.

FIG. 3C shows a third structure, where ambient temperature sensor ($S_a$) 302C is mounted on a separate PCB that is completely isolated from the main PCB through a mechanical structure having two or more support legs. As shown in FIG. 3C, support legs 364 and 365 may serve as two thermal pathways from temperature compensation sensor 301C and ambient temperature sensor 302C.

With all three structures shown in FIGS. 3A-C, there are two temperature sensors, one at each side of the narrow thermal pathways. Ambient temperature sensor ($S_a$) 302A-C measures the ambient temperature and temperature compensation sensor ($S_{c1}$) 301A-C provides temperature information to calculate the temperature rise due to internal heat.

With all three structures shown in FIGS. 3A-C, a thermal barrier may be added to isolate the air flow between main component and the sensor compartment.

With some embodiments, there may be more than one compensation sensors where each compensation sensor may be located at the one end of each thermal pathway. The length of each thermal pathway should be minimized with sufficient space to accommodate the compensation sensors. In addition, the thermal resistance ratio of each path needs to be determined, for example, based on controlled experiment.

Referring to FIG. 3B, there are situations where only one temperature compensation sensor may be used for thermal pathways 362 and 363. First, the two pathways 362 and 363 between compensation sensor 301B and ambient temperature sensor 302B should be symmetric. Second, compensation sensor 301B should be close enough to the starting points of the two pathways 362 and 363 so that the temperature at the two starting points of the pathways is approximately the same and can be measured by temperature compensation sensor 301B.

Figure 4:
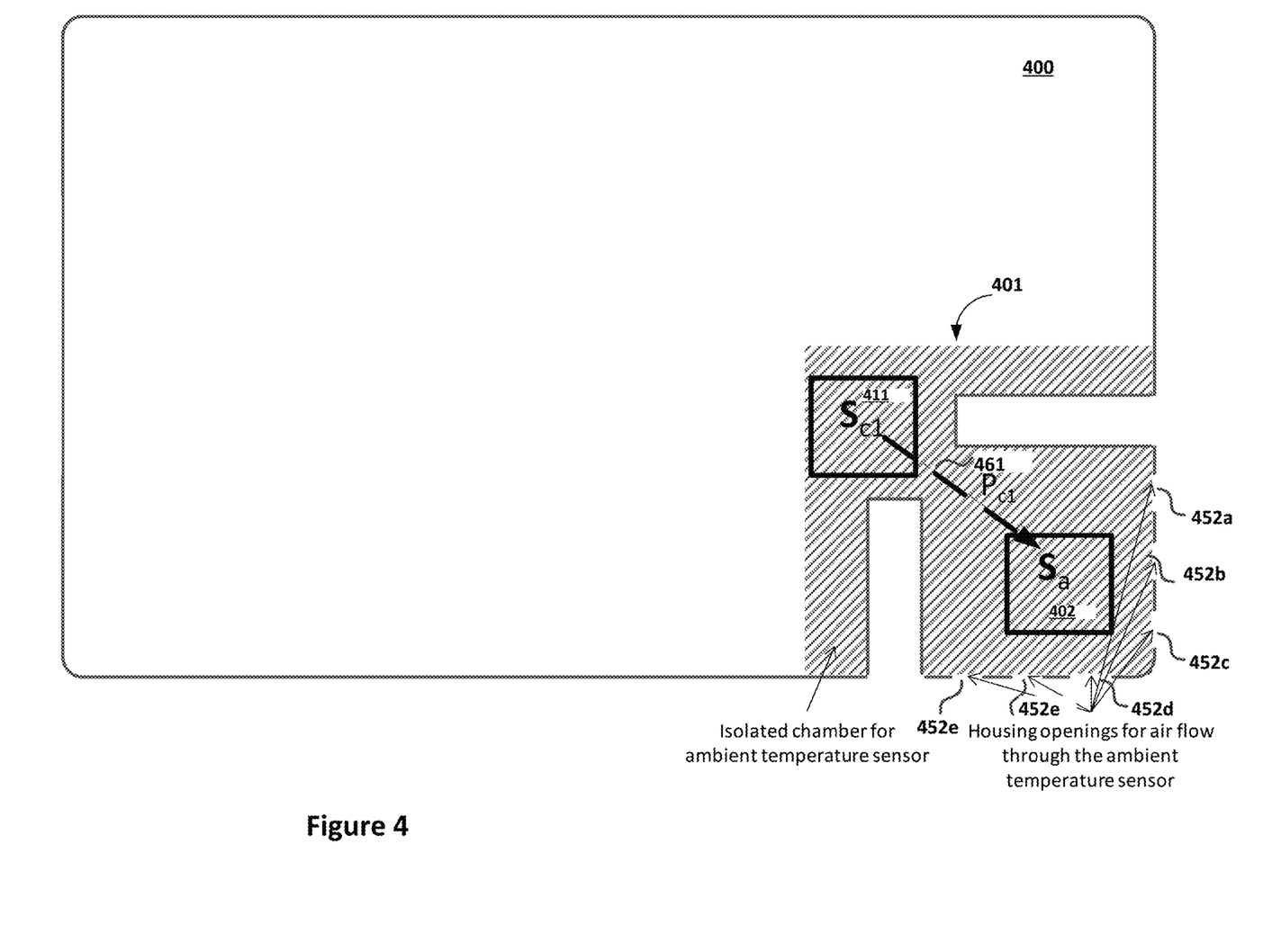
FIG. 4 shows a physical model to estimate an impact of internally generated heat on an ambient temperature sensor of an electronic thermostat in accordance with an embodiment.

FIG. 4 shows a physical model used to estimate an impact of internally generated heat on ambient temperature sensor 402 of an electronic thermostat 400 in accordance with an embodiment.

A thermal model is established to estimate the impact of the internal heat on ambient temperature sensor 402 and thus to compensate for the impact to provide a more accurate measurement of the ambient temperature. With one aspect of the embodiments, the following conditions are assumed:

First, there is no significant heat transferred by air convection from the main compartment of electronic thermostat 400 close to ambient temperature sensor 402. This can be ensured by locating ambient temperature sensor 402 within sensor chamber 401 (in other words, a sensor compartment, which is substantially isolated from all the heat sources on the PCB (the main compartment)).

Second, air flow is sufficient between the sensor compartment and ambient environment for an accurate temperature measurement. With the exemplary design shown in FIG. 4, there are a sufficient number of openings 452*a-e* through the housing wall near sensor compartment 401. (In the exemplary embodiment shown in FIG. 4, the perimeter of sensor chamber 401 includes portions of the adjacent housing walls.)

The thermal connection between ambient temperature sensor ($S_a$) 402 and temperature compensation sensor ($S_{c1}$) 411 may be constrained by only one or two thermal narrow pathways, for example thermal pathway 461 ($P_{c1}$). This approach essentially restricts all the internal heat to flow from the main compartment to ambient temperature sensor 402 via the thermal pathways through sensor chamber (compartment) 401. Thus, the impact of the internally generated heat may be modeled so that the measured ambient temperature can be compensated using the measurement by temperature compensation sensor 411 as will be discussed.

Figure 5:
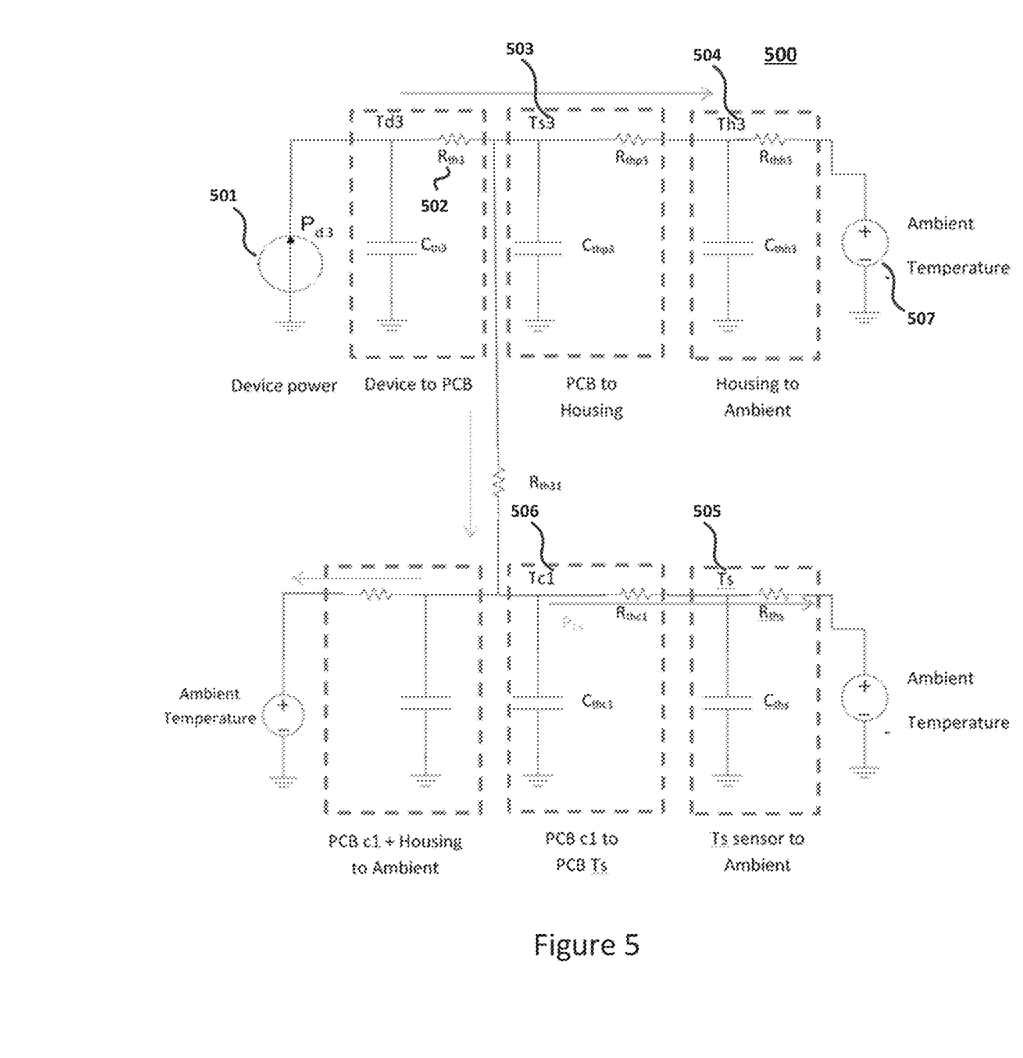
FIG. 5 shows an equivalent thermal circuit for an individual component of an electronic thermostat in accordance with an embodiment.

FIG. 5 shows equivalent thermal circuit 500 of an electronic thermostat in accordance with an embodiment. Thermal circuit 500 models only an individual component, for example, the power supply circuit 103 (S3 as shown in FIG. 1), where:

$P_d$ represents the thermal power generated by a component. For example the thermal power generated by the DC-DC convertor in the power supply circuit 103 is shown as $P_{d3}$ 501.

$R_{th}$ represents the thermal resistance between different locations. For example, the thermal resistance between the DC-DC convertor at power supply circuit 101 to the edge of PCB near the housing is denoted as $R_{th3}$ 502.

$T_{s3}$ 503 represents the PCB temperature at power supply circuit 103.

$T_{h3}$ 504 represents the temperature at the housing due to the thermal power from power supply circuit 103.

$T_s$ 505 represents the PCB surface temperature at ambient temperature sensor 102.

$T_{c1}$ 506 represents the PCB surface temperature at temperature compensation sensor 101.

The thermal power generated by power supply circuit 103 flows through the PCB to the housing and finally to the ambient environment at ambient temperature 507. In addition, the thermal power is also distributed to the location (point) of ambient temperature sensor $T_s$ 102 via the location (point) of temperature compensation sensor 101.

By restricting the thermal flow from the location of sensor 101 to the location of sensor 102, the thermal power passing through the thermal pathway passage is essentially the power flow into the sensor board and consequently the thermal heat affecting temperature sensor 102. Otherwise, the thermal power from the location of temperature compensation sensor 101 could also flow to the housing via other thermal paths.

Assuming there is no significant heat generated by sensors 101 and 102, under static conditions and based on the conduction heat flow relationship:

$$\Delta T_{AB} = T_A - T_B = P_D * R_{\theta AB}$$

Therefore, $$\Delta T_{c1} = T_{c1} - T_s = P_{c1} * R_{thc1} \quad (1)$$

$$\Delta T_{sa} = T_s - T_{ambient} = P_{c1} * R_{ths} \quad (2)$$

Based on equations (1) and (2)

$$T_{ambient} = T_s - P_{c1} * R_{ths} = T_s - (\Delta T_{c1}/R_{thc1}) * R_{ths}$$

$$T_{ambient} = T_s - (R_{ths}/R_{thc1}) * \Delta T_{c1} \quad (3)$$

From equation (3), by keeping the thermal resistance ratio constant (which equals $R_{ths}/R_{thc1}$ and is denoted by C), the ambient temperature $T_{ambient}$ may be computed from the measurement result of ambient temperature sensor $T_s$ and temperature compensation sensor $T_{c1}$.

The thermal resistance ratio is typically a constant over a temperature range, which may or may not span the entire temperature range of operation. With a first example:

C=0.8 which may be obtained via controlled experiment.
$T_c$=26.4° C.
$T_s$=25.8° C.

$$T_{ambient} = 25.8 - 0.8 * (26.4 - 25.8) = 25.32° C.$$

Consequently, the compensated temperature is 25.32° C.

There may be applications where the thermal resistance ratio is different for a plurality of temperature ranges over which the electronic thermostat operates. In the following example, $C_1$ and $C_2$ denote the thermal resistance ratios for a first and second temperature ranges, respectively.

$C_1$=0.7 for 0° C. to 25° C.
$C_2$=0.8 for 25° C. to 40° C.

If $T_s$ is measured as 20° C., we use $C_1$ and hence:

$$T_{ambient} = 15.8 - 0.7 * (16.4 - 15.8) = 15.38° C.$$

The value of ($R_{ths}/R_{thc1}$) may be determined via experimentation with the actual electronic thermostat for the desired measurement temperature range. Based on the above approach, the thermal resistance ratio should be fairly constant over the measurement range. However, when the thermal resistance ratio varies across the measurement range, a look-up table may be created for each temperature delta point at $\Delta T_{c1}$.

Figure 6:
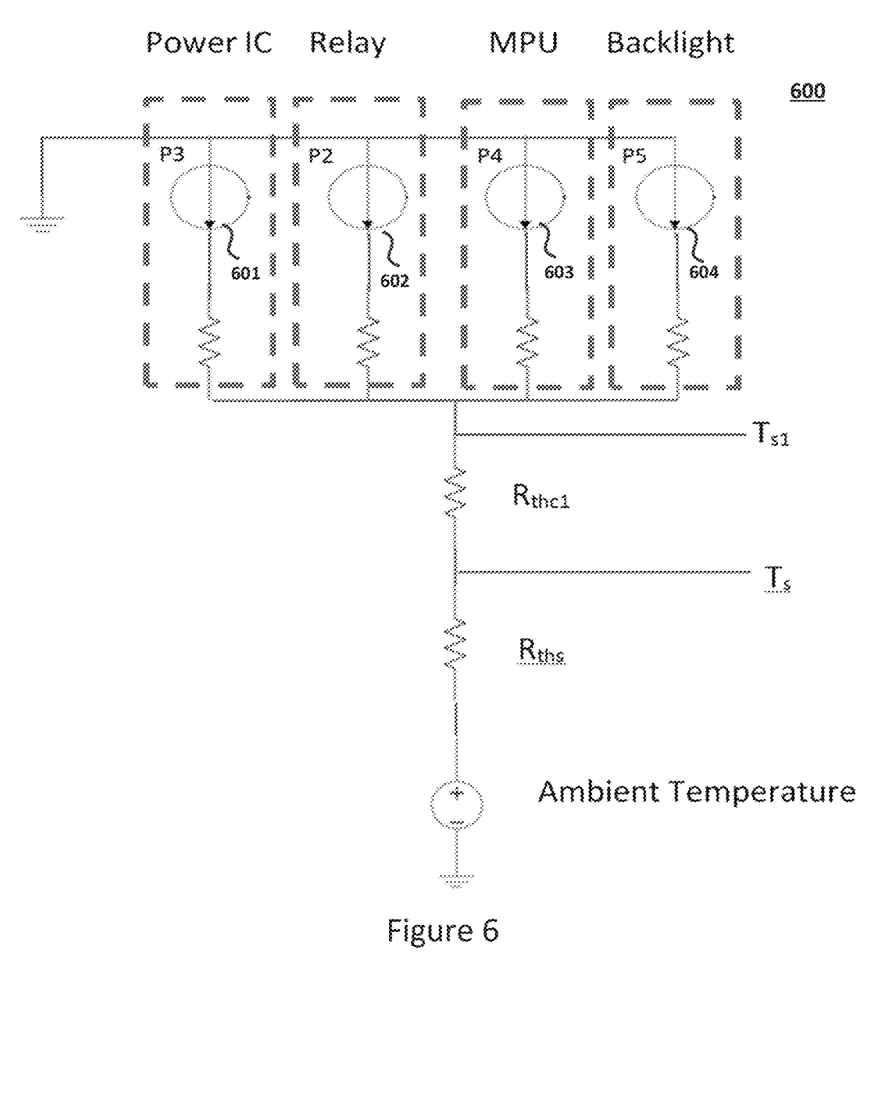
FIG. 6 shows an equivalent thermal circuit for multiple components of an electronic thermostat in accordance with an embodiment.

FIG. 6 shows equivalent thermal circuit 600 for multiple components of an electronic thermostat in accordance with an embodiment. There is often more than one heat source in an electronic thermostat. The model may be extended to cover multiple heat sources 601-604 by ensuring that the heat flow from multiple heat sources 601-604 is through the one or two narrow thermal pathways. Hence, all the heat flow from the different heat sources flows through the temperature compensation sensor 101 ($S_{C1}$) to ambient temperature sensor $S_a$ 102.

However, without loss of generality, equations (1) and (2) are still applicable for the condition of multiple heat sources. In addition, the ratio of $R_{thc1}$ and $R_{ths}$ is almost the same for the different devices. Thus, once the thermal resistance ratio is determined, it may be applied on all devices.

The following summarizes the characteristics of the above model:

First, the heat flow on any position of PCB is typically difficult to estimate since there are many different possible thermal paths for the heat flow. However, the thermal paths may be limited by a special PCB layout structure with one or more narrow thermal pathways from the main body to a small ambient temperature sensor board. Since the temperatures of the locations at the two ends of the narrow thermal pathway can be measured, the heat flow through the one or more narrow thermal pathways can be measured. If the heat flow can be measured, the heat flow affecting the ambient temperature sensor can also be calculated, and thus the ambient temperature may be determined as well by the appropriate compensation.

Second, the compensation procedure is similar with a plurality of heat sources. Consequently, the approach is the same as with a single heat source provided that the above design assumptions are valid.

The thermal resistance ratio ($R_{ths}/R_{thc}$) may be determined experimentally before regular operation of an electronic thermostat. For example, the thermal resistance ratio may be approximated from one or more experimental values based on Equation 3. For example, by rearranging Equation 3:

$$R_{ths}/R_{thc1} = (T_s - T_{ambient})/\Delta T_{c1}$$

Figure 7:
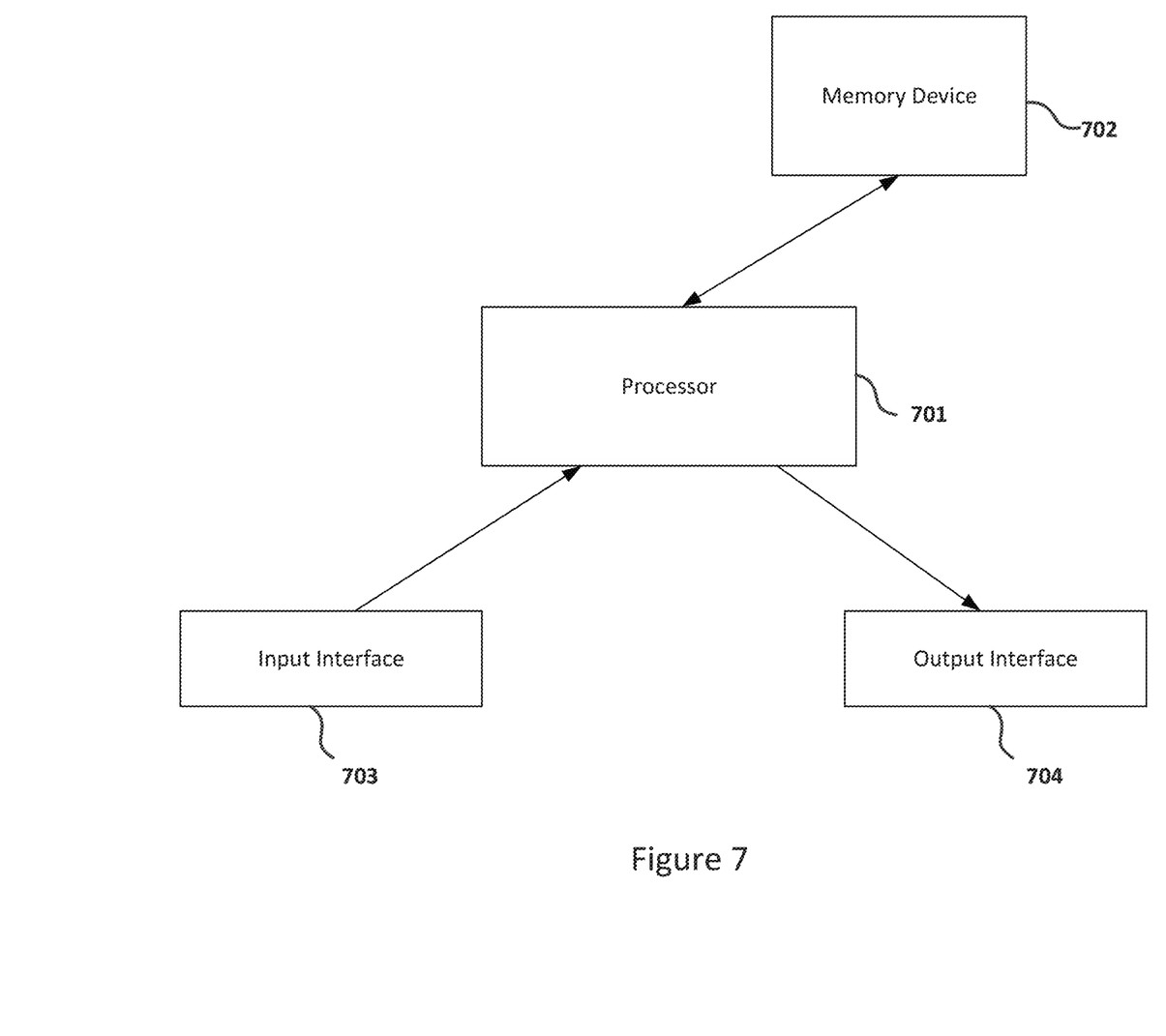
FIG. 7 shows processor circuitry of an electronic thermostat in accordance with an embodiment.

FIG. 7 shows processor circuitry 700 of an electronic thermostat (for example, thermostat 100 or 200 as shown in FIG. 1 or 2, respectively) in accordance with an embodiment. Processing circuitry 700 comprises processor 701, memory device 701, input interface 703, and output device 704.

Processor 701 receives measurement data from sensors 101 and 102 via input interface 703 and provides output signals to display 105 and/or relay 107 via output interface 704.

Processor 701 controls operation of electronic thermostat 200 by executing computer readable instructions stored on memory device 702. For example, processor 701 may execute computer readable instructions to perform process 800 as will be discussed with FIG. 8. Embodiments may support a variety of computer readable media that may be any available media accessed by processor 701 and include both volatile and nonvolatile media, removable and non-removable media. By way of example, and not limitation, computer readable media may comprise a combination of computer storage media and communication media.

Computer storage media may include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Processing circuitry 700 may be implemented in a number of ways. For example, processing circuitry 700 may be implemented with a microcontroller that typically includes a central processing unit (CPU), in addition with a fixed amount of RAM, ROM and other peripherals all embedded on a single chip. However, processing circuitry may be implemented with a plurality of integrated circuits and/or discrete electronic components.

Figure 8:
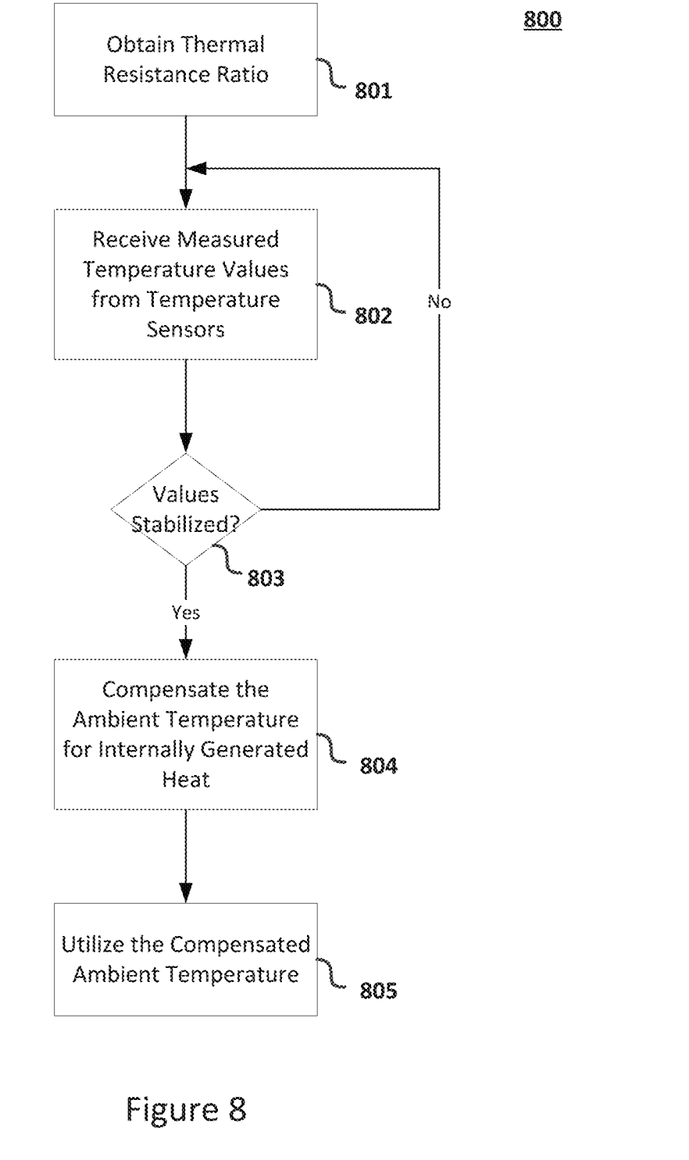
FIG. 8 shows a flowchart that compensates the ambient temperature for internally generated heat of an electronic thermostat in accordance with an embodiment.

FIG. 8 shows process 800 that compensates the ambient temperature for internally generated heat of an electronic thermostat based on the above approach. With some embodiments, processor 701 (as shown in FIG. 7), which may be located on the electronic thermostat, may perform process 800 by executing computer-executable instructions.

At block 801, process 800 obtains the estimated thermal resistance ratio for the electronic thermostat. The ratio may be determined in a one of different manners, including experimentation as discussed above.

At block 802, processor 701 receives temperature measurements $T_{c1}$ and $T_s$ from temperature sensors 101 and 102, respectively (as shown in FIG. 1). At block 803, processor 701 verifies that the measured temperatures have stabilized to ensure that a static condition exists. For example, processor 701 may wait until compensation temperature $T_{c1}$ stabilizes before compensating the measured ambient temperature $T_s$. Various criteria for detecting stabilization may be used. For example, when the difference between consecutive measurements of the compensation temperature is less than a predetermined amount, processor 701 may deem that stabilization exists.

The stability period may be dynamically determined, where the change of measured temperature from the both sensors 101 and 102 is within a threshold value (for example, +/−0.1° C.), over a particular number of measurements (for example, five measurements). Moreover, there may be a predetermined time constant (that may be based on experiments over the range of operating temperatures), where the temperature is assumed to be stable if the above condition is not reached.

If so, processor 701 determines the compensation to the measured temperature from ambient temperature sensor 102 to obtain the ambient temperature proximate to the electronic thermostat at block 804. The compensated ambient temperature may then be used to control the associated system (for example HVAC system) at block 805.

Figure 9:
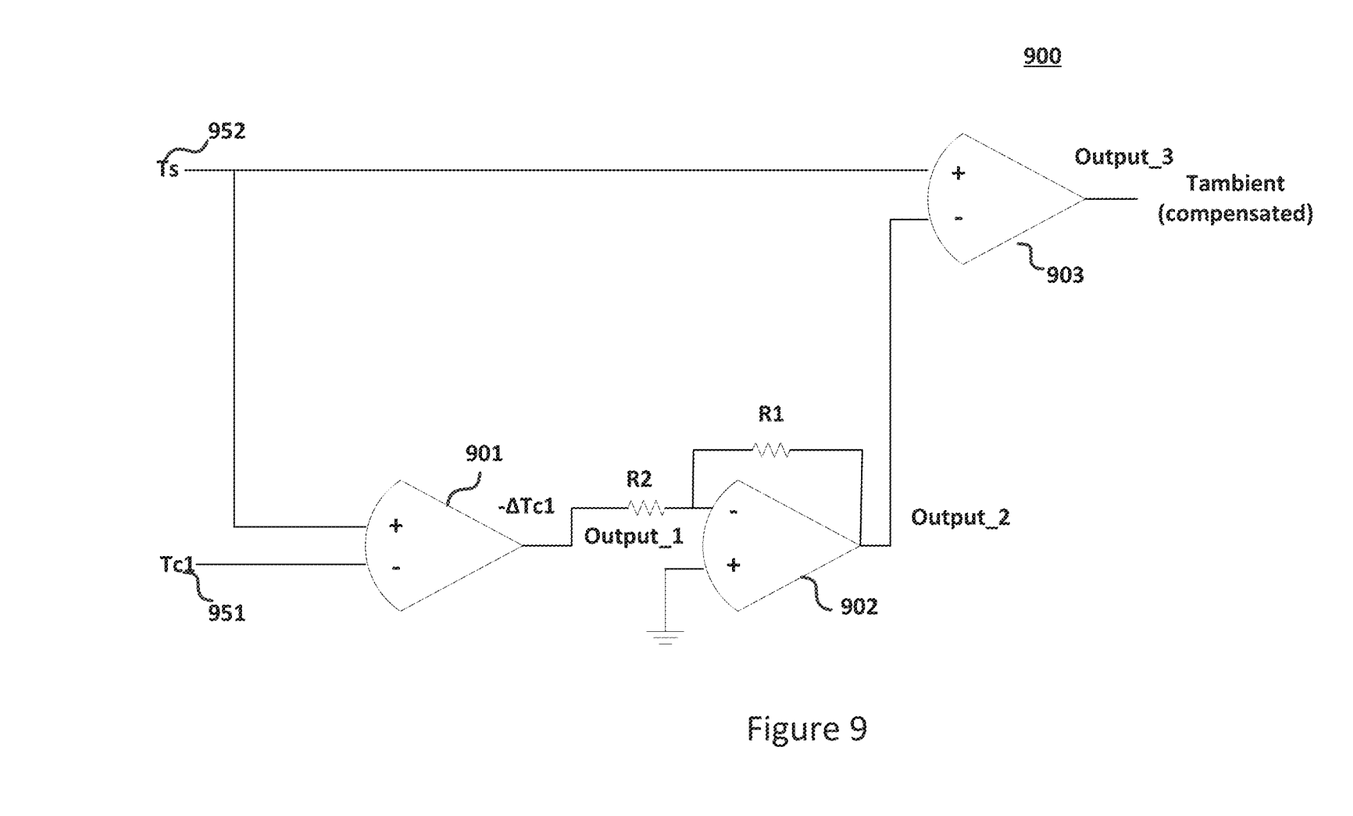
FIG. 9 shows analog circuitry for compensating a measured temperature from an ambient temperature sensor to obtain a compensated ambient temperature.

FIG. 9 shows analog circuitry 900 for compensating the measured temperature from an ambient temperature sensor to obtain the ambient temperature. While some embodiments may determine the ambient temperature in a digital manner by a computing device (for example, processor 701 as shown in FIG. 7), some embodiments may determine the ambient temperature with analog circuitry such as circuitry 900. For example, temperature compensation sensor 101 and ambient temperature sensor 102 may operate in the analog domain processing analog signals 951 and 952 from temperature compensation sensor 101 and ambient temperature sensor 102, respectively. However, if temperature compensation sensor 101 and ambient temperature 102 provide digital signals, the digitals signals may be converted into the analog domain by one or more digital to analog converters. Conversely, the output of circuit 900 may be transformed into the digital domain by an analog to digital converter.

Amplifiers 901 and 903 are difference amplifiers with unity gain while amplifier 902 has a gain of R1/R2 and may be implemented with an operational amplifier. Based on circuit analysis, one finds:

$$\text{Output\_3} = T_s - \text{Output\_2} = T_s + R2/R1 * \text{Output\_1} = T_s - R1/R2 * (T_{c1} - T_s)$$

When R1/R2 equals $R_{ths}/R_{thc1}$, $\text{Output\_3} = T_s - R_{ths}/R_{thc1} * \Delta T_{c1}$ (which is the same as Equation 3). It should be noted that R1/R2 is an electrical resistance ratio while $R_{ths}/R_{thc1}$ is an thermal resistance ratio as previously discussed.

Exemplary Embodiments include:

With a first exemplary embodiment, a procedure is supported for placing an ambient temperature sensor and a temperature compensation sensor for an electronic thermostat. The procedure provides an accurate compensation for the internally generated heat to the measured ambient temperature.

With a second exemplary embodiment, a multiple temperature sensor model is based on particular positions. There are at least two temperature sensors situated in the thermostat to sense the temperature of ambient temperature and the temperature at a particular position on a PCB. The temperature sensing at the particular point of the PCB measures the temperature at one end of a thermal pathway to a small ambient temperature sensor board.

With a third exemplary embodiment, a sensor chamber restricts heat convection. The chamber isolates the air flow between major heating components of the thermostat (for example, located in the main compartment) and the temperature compensation and ambient temperature sensors. The two temperature sensors are typically located inside the sensor chamber.

With a fourth exemplary embodiment, an electronic thermostat constrains thermal connectivity of the main and sensor compartments through only one or two narrow thermal pathways.

With a fifth exemplary embodiment, a temperature compensation relationship and a corresponding thermal conducting mode is indicative of a thermal compensation of the ambient temperature.

With a sixth exemplary embodiment, a method obtains an estimation of the thermal resistance that may be used when determining the temperature compensation.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method for compensating a measured temperature for an electronic thermostat, the method comprising:
    thermally isolating a temperature compensation sensor and an ambient temperature sensor from a main compartment of the electronic thermostat, wherein the temperature compensation sensor and the ambient temperature sensor are located in a sensor chamber;
    creating a first thermal pathway between the temperature compensation sensor and the ambient temperature sensor, wherein the first thermal pathway thermally connects from the main compartment to the sensor chamber and restricts heat flow to the temperature compensation sensor and the ambient temperature sensor;
    obtaining a thermal parameter that characterizes a thermal characteristic of the electronic thermostat;
    receiving a measured ambient temperature ($T_s$) and a compensation temperature ($T_{c1}$) from the ambient temperature sensor and the compensation temperature sensor, respectively; and
    determining a temperature indicator of a compensated ambient temperature ($T_{ambient}$) from the measured ambient temperature, the compensation temperature and the thermal parameter.

2. The method of claim 1, wherein the determining further comprises:
    obtaining a compensation value based on a temperature difference between the compensation temperature and the measured ambient temperature; and
    obtaining the compensated ambient temperature by subtracting the compensation value from the measured ambient temperature.

3. The method of claim 2, wherein the thermal parameter comprises a thermal resistance ratio, and wherein the obtaining the compensation value comprises:
    multiplying the thermal resistance ratio by the temperature difference.

4. The method of claim 1, wherein the thermal parameter comprises a first thermal resistance ratio over a first ambient temperature range and a second thermal resistance ratio over a second ambient temperature range, wherein the first and second ambient temperature ranges are indicative of an ambient temperature of a proximate region around the electronic thermostat, and wherein the determining comprises:
    using the first thermal resistance ratio over the first ambient temperature range and the second thermal resistance ratio over the second ambient temperature range.

5. The method of claim 1 further comprising: creating a second thermal pathway between the temperature compensation sensor and the ambient temperature sensor, wherein the temperature compensation sensor is located along both the first and second thermal pathways.

6. The method of claim 1 further comprising: waiting for the compensation temperature to stabilize before compensating the measured ambient temperature.

7. The method of claim 1 wherein a perimeter of the sensor chamber comprises at least one internal partition between the main compartment and the sensor chamber.

8. The method of claim 7, wherein the perimeter further comprises one side of a housing of the electronic thermostat.

9. The method of claim 1, comprising:
    utilizing the temperature indicator by an associated heating, ventilation, and air conditioning (HVAC) system.

10. The method of claim 1 comprising:
    limiting the heat flow from the main compartment to the temperature compensation sensor and the ambient temperature sensor through the first thermal pathway.

11. An electronic thermostat controlling a home Internet of Things (IoT) system, the electronic thermostat comprising:
    a first printed circuit board;
    a main compartment;
    a sensor chamber;
    at least one component that is located in the main compartment on the first printed circuit board;
    a temperature compensation sensor and an ambient temperature sensor located in the sensor chamber;
    the sensor chamber configured to thermally isolate the temperature compensation sensor and the ambient temperature sensor from the main compartment and configured to establish a first thermal pathway between the temperature compensation sensor and the ambient temperature sensor, wherein the first thermal pathway thermally connects to the main compartment to the sensor chamber and restricts heat flow to the temperature compensation sensor and the ambient temperature sensor from the main compartment; and
    a compensation circuit configured to compensate a measured ambient temperature ($T_s$) based on a measured compensation temperature ($T_{c1}$), configured to obtain a compensated ambient temperature ($T_{ambient}$), and configured to provide the compensated ambient temperature to the home IoT system.

12. The electronic thermostat of claim 11, wherein the sensor chamber comprises a second printed circuit board and a mechanical structure having two or more support legs, wherein the second printed circuit board is separate from the first printed circuit board, wherein the ambient temperature sensor is mounted on the second printed circuit board via the mechanical structure, and wherein the two or more support legs serve as thermal pathways.

13. The electronic thermostat of claim 11, wherein a perimeter of the sensor chamber comprises:
    an internal partition thermally separating the main compartment from the sensor chamber.

14. The electronic thermostat of claim 13, wherein the perimeter of the sensor chamber further comprises:
    one side of a housing of the electronic thermostat.

15. The electronic thermostat of claim 11, wherein the at least one component located in the main compartment includes a processing device and the compensation circuit also includes the processing device and wherein the processing device is configured to:

obtain a thermal parameter that characterizes a thermal characteristic between of the electronic thermostat;

receive the measured ambient temperature ($T_s$) and the measured compensation temperature ($T_{c1}$) from the ambient temperature sensor and the compensation temperature sensor, respectively; and determine a temperature indicator of the compensated ambient temperature ($T_{ambient}$) from the measured ambient temperature, the measured compensation temperature, and the thermal parameter; and provide the temperature indicator to the home IoT system.

16. The electronic thermostat of claim 15, there in the processing device is further configured to:

obtain a compensation value based on a temperature difference between the measured compensation temperature and the measured ambient temperature; and obtain the compensated ambient temperature by subtracting the compensation value from the measured ambient temperature.

17. The electronic thermostat of claim 16, wherein the thermal parameter comprises a thermal resistance ratio and the processing device is further configured to multiply the thermal resistance ratio by the temperature difference.

18. The electronic thermostat of claim 11, wherein a thermal resistance ratio is indicative of thermal characteristics of the electronic thermostat and wherein the compensation circuit includes an analog circuit configured to obtain a compensation amount based on a difference between the measured compensation temperature and the measured ambient temperature and on the thermal resistance ratio.

19. The electronic thermostat of claim 11, comprising:

a printed circuit board (PCB), wherein the at least one component, the ambient temperature sensor, and the temperature compensation sensor are electrically mounted onto the PCB and wherein the PCB has at least one notch to further restrict the heat flow along the first thermal pathway.

20. One or more non-transitory computer-readable media storing instructions that, when executed by an electronic thermostat comprising at least one processor, memory, an ambient temperature sensor, and a temperature compensation sensor, cause the electronic thermostat to:

obtain a thermal resistance ratio that characterizes a thermal characteristic of the electronic thermostat;

receive a measured ambient temperature ($T_s$) and a compensation temperature ($T_{c1}$) from the ambient temperature sensor and the compensation temperature sensor, respectively, wherein the temperature compensation sensor and the ambient temperature sensor are located in a sensor chamber; and determine a temperature indicator of a compensated ambient temperature ($T_{ambient}$) from the measured ambient temperature, the compensation temperature, and the thermal resistance ratio.

21. The one or more non-transitory computer-readable media of claim 20, wherein the instructions, when executed by the electronic thermostat, further cause the electronic thermostat to:

obtain a temperature difference between the compensation temperature and the measured ambient temperature; obtain a compensation value by multiplying the thermal resistance ratio by the temperature difference; and obtain the compensated ambient temperature by subtracting the compensation value from the measured ambient temperature.

* * * * *